(No Model.)  3 Sheets—Sheet 1.

C. F. B. CASPARI.
FRUIT DRIER.

No. 342,243.  Patented May 18, 1886.

Witnesses,
Geo. H. Strong.

Inventor,
C. F. Butte Caspari
By Dewey & Co.
attys (No Model.) 3 Sheets—Sheet 2.

C. F. B. CASPARI.
FRUIT DRIER.

No. 342,243. Patented May 18, 1886.

Witnesses,
Geo. H. Strong.
J. H. Rouse.

Inventor,
C. F. Butte-Caspari
By Dewey & Co.
atty (No Model.)

C. F. B. CASPARI.

FRUIT DRIER.

No. 342,243. Patented May 18, 1886.

3 Sheets—Sheet 3.

Witnesses,
Geo. H. Strong.
J. H. Nourse

Inventor
C. F. Butte Caspari
By Dewey & Co.
Att'ys

N. PETERS, Photo-Lithographer, Washington, D. C.

UNITED STATES PATENT OFFICE.

CHARLES F. BUTTE CASPARI, OF SAN FRANCISCO, CALIFORNIA, ASSIGNOR OF ONE-HALF TO SAMUEL L. THELLER, OF SAME PLACE.

FRUIT-DRIER.

SPECIFICATION forming part of Letters Patent No. 342,243, dated May 18, 1886.

Application filed March 12, 1886. Serial No. 195,031. (No model.)

*To all whom it may concern:*

Be it known that I, CHARLES F. BUTTE CASPARI, of the city and county of San Francisco, State of California, have invented an Improvement in Fruit-Driers; and I hereby declare the following to be a full, clear, and exact description of the same.

My invention relates to certain improvements in apparatus for drying and preserving fruit, food, or other materials, and depriving the exposed material of moisture by means of currents of air warmed, desiccated, or impregnated with anti-putrescent or other substances.

It consists of a chamber divided by a partition or having a continuous passage from end to end, and provided with supports for trays containing the substances to be treated, passages through which the heated or desiccated air is passed, a furnace and means for preparing the air to be used in the chamber, and a means for producing currents transversely from top to bottom through the trays, and causing the air to circulate in alternately-reversed directions horizontally through the chambers, so as to remove the moisture from the substances to be treated, at the same time exposing them to the influence of the chemicals impregnated in the prepared air.

Figure 1:
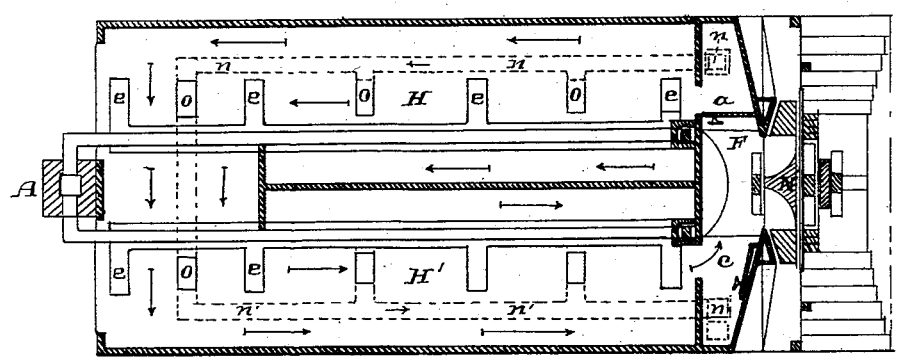
Figure 2:
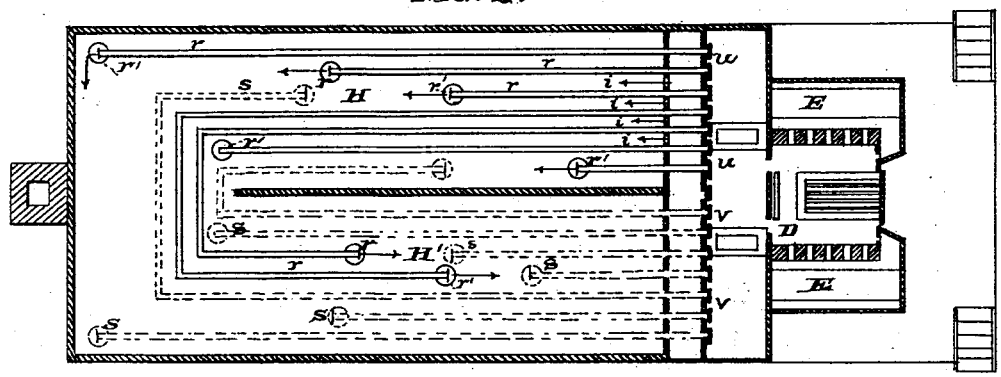
Figure 3:
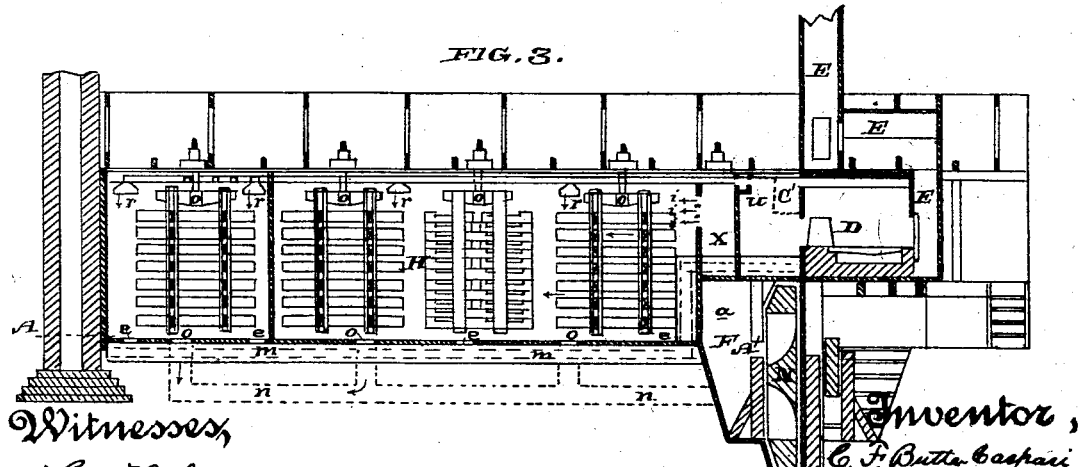
Figure 4:
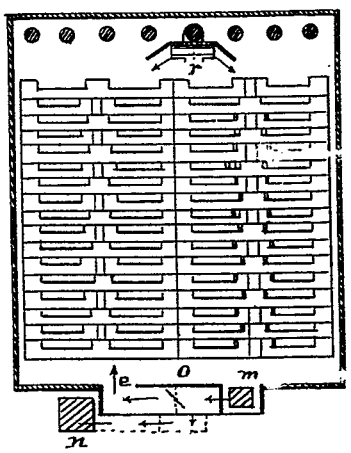
Figure 5:
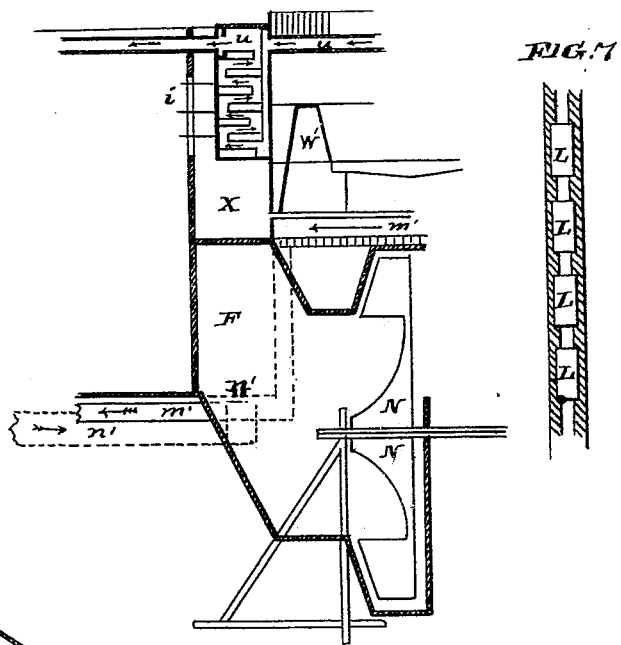
Figure 7:
Figure 6:
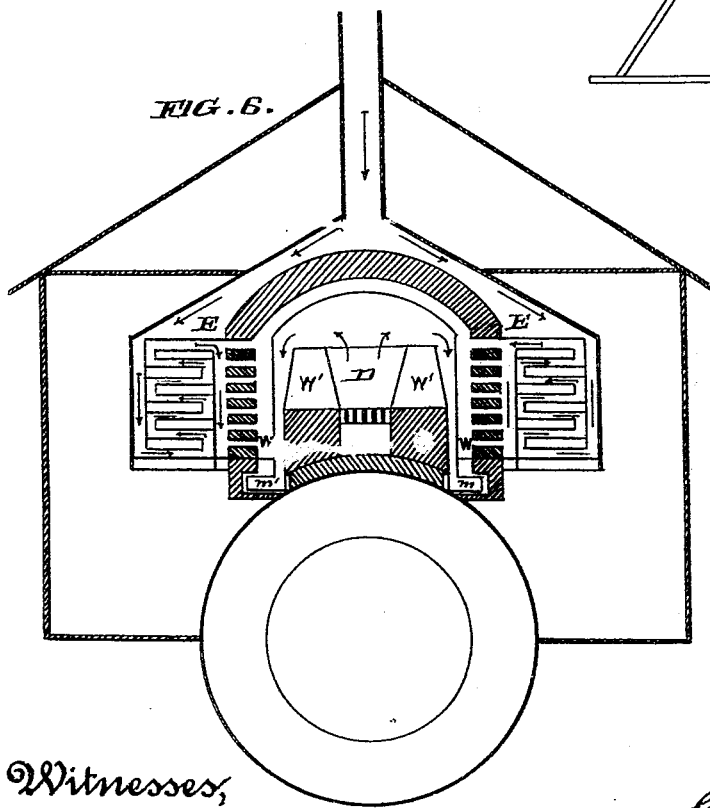
Figure 8:
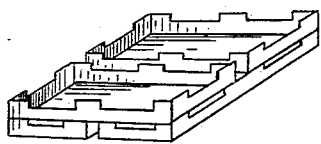
Figure 9:
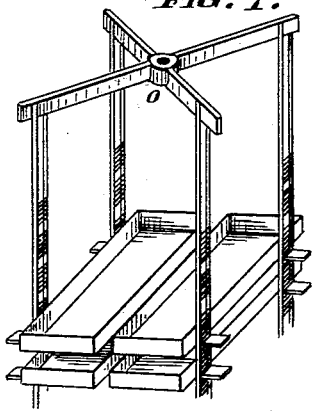
Figure 12:
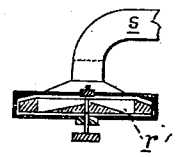
Figure 10:
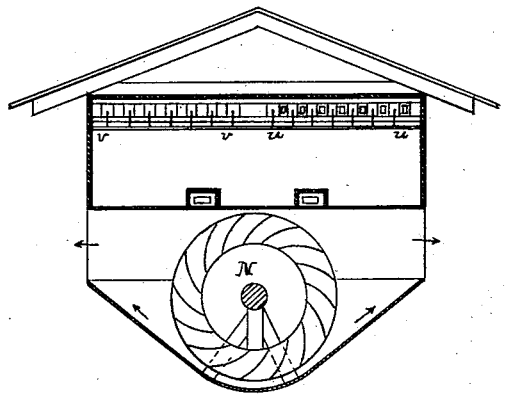
Figure 11:
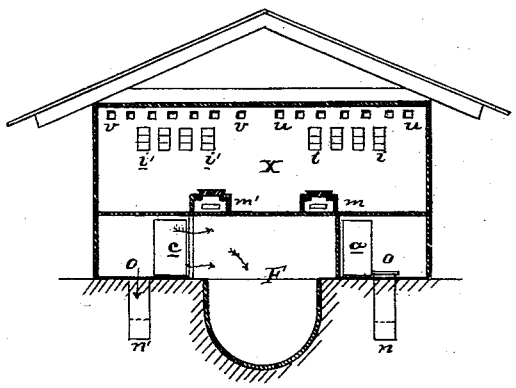

Referring to the accompanying drawings for a more complete explanation of my invention, Figure 1 is a horizontal section showing the ground plan of the exhaust-chamber and air-channels and other parts. Fig. 2 is a horizontal section taken so as to show the arrangement of the distributing-pipes in or near the ceiling and other details. Fig. 3 is a vertical section taken through the drying-chamber, stove, and draft apparatus or fan. Fig. 4 is an enlarged transverse section showing the mouth of the distributing pipe and wheel. Fig. 5 is a vertical section of the stove, the hot-air chambers, and exhaust-chamber, with the fan-wheel F. Fig. 6 is an enlarged transverse vertical section of the stove or heater, showing the desiccators and other parts. Figs. 7, 8, and 9 show the manner of supporting the trays within the chambers with the turning apparatus on the ceiling. Fig. 10 is a transverse section showing the exhaust-wheel. Fig. 11 is a transverse section showing the passage leading to the exhaust-wheel. Fig. 12 is an enlarged view of one of the turbine distributers $v$.

H and H' is a chamber having any desired length and direction; but it should return upon itself, so that the ends are side by side or near each other. The chamber may be provided with transverse diaphragms, by which any portion of the length may be cut off, so as to reduce the size of the chamber when a small quantity of work is to be done.

At one end of the apparatus is a stove or heater, D, into which atmospheric air is drawn through a chimney or flue of considerable height, so as to insure its being pure. This air may pass over the trays E upon each side of the heater, containing any material by which the air may be deprived of its moisture. After passing over these trays the air passes in through numerous small pipes or passages into the spaces around the heater, and from this the heated air passes out into a chamber, $u\,u\,v\,v$, from which it is led through pipes $r$ and $s$ along the upper part near the ceiling of the drying-chamber. Outside of this chamber $u$ is another chamber, X, where the air which is warmed by radiation from the heater and the chamber $u\,v$ is stored, and from which it passes directly into the drying-chamber through openings at $i$. The two sets of pipes $r\,r$ and $s\,s$, passing along the upper part of the chamber, are of different lengths, with outlets equally divided, through which the heated air may be discharged downward into the upper part of the chamber.

Below the stove or heater is a rotary fan or suction wheel, N, revolving in a chamber or passage, F, which communicates with the drying-chambers H and H' by means of the ports $a$ and $c$, and of the pipes $n$ and $n'$, which extend along beneath the floor of the chamber, and have openings or passages $o\,o\,o$ leading into them at intervals from one end to the other.

(A.) When the fan N is in operation, a draft is produced through the channels $n$ and $n'$ and the pipes $r$ or $s$, and this causes the atmospheric air to be drawn down the entrance-shaft passing through the desiccators E E, around the heating-space of the stove D. The partly desiccated and heated air collects in the chamber $u\,u\,v\,v$, and passes through the distributing-pipes along the ceiling into the drying-chamber, circulating downward through the exposed material, absorbing as much moisture as possible, and forming sediments of the chemicals it contains. The partly-saturated air enters the openings $o\,o$, passing through the air-channels $n$ and $n'$ to the exhaust-chamber, from which it is discharged at the periphery of the rotary fan into the open air. It will be seen that by this method of drawing the air downward instead of allowing it to rise upward, as is usual in driers, the descending current carries with it all impregnated matter and divides it equally over the whole drying-chamber. The rising warm air from the flues meets the descending draft, the velocity of the latter is retarded, and, overcoming the resistance, a most perfect intermixture takes place, time is allowed and a very heavy percentage of saturation takes place equally over the exposed material, and all partial currents and consequent stagnations and imperfect circulation are successfully regulated by the influence of the power of the rotary fan.

(B.) The passages which lead from the drying-chambers H and H' into the exhaust-chamber F are provided with ports or gates $a$ and $c$, which are so arranged that when one is closed the other is opened, and vice versa. These ports are mechanically connected with the slide over the openings of the distributing-pipes $u\,u$ and $v\,v$ and the shutters $i\,i$ below them. When the port $c$ is opened, as shown in the plans, the distribution-pipes $u\,u$ are open, likewise the shutters $i\,i$ below them, while the port $a$, the distribution-pipes $v\,v$, and the shutters $i$ below are all closed. The rotary fan is steady at work, unaltered and uninfluenced. It produces a powerful suction—nearly one pound per square inch—and draws the atmospheric air through the air-shaft, the desiccator, and through the stove, and deposes the heated desiccated air into the hot-air reservoir $u\,u\,v\,v$. The port $c$ being opened, the hot air passes through the opening $u\,u$, and is discharged near the ceiling and hurled over the whole width by the turbines $r'\,r'\,r'$ at the mouths of the distributing-pipes. The descending current of warm air circulates through the material exposed, and within one-half a minute it is passing, partly saturated, through O O O into $n$ and $n'$, and through $c$ into the suction of the fan. The general current has been from $a$ around the chambers to $c$. If the port $c$ is closed, the pipes $u\,u$ in the hot-air reservoir close, and also the shutters $i\,i\,i$ below $u\,u$. The port $a$ opens automatically, and with it moves the slide over $u\,u$ and from $v\,v$. The hot-air reservoir discharges now into the dotted pipe $v\,v$, and the air is discharged at $s\,s$. The descending current again performs its work, and passes the saturated air into $o\,o\,o$ and $n\,n'$ through $a$ into the suction of the fan. This time the general current has been from $c$ around the chamber to $a$ in the direction of the arrows in the plans reversed. By this arrangement the general current is passed for a certain time from the heater through one of the horizontal drying-chambers away from the heater and returned through the other chamber, the transverse currents and distributers acting simultaneously, after which the general current is reversed, the hot air entering the opposite end and flowing back. This prevents a more rapid drying at one end than at the other, and the fruit which is first subjected to the highest degree of heat is afterward subjected to a lower degree by a reversal of the current, while that at the opposite end is subjected to a higher degree. The heat is also thus applied to the opposite sides of the fruit alternately, and is equalized throughout the whole chamber.

The trays are made of galvanized iron wire, upon which the fruit or material to be dried is placed, and are supported in any suitable or desirable manner. In the present case I have shown them about seven feet long and three feet four inches wide, and as having placed bars between them projecting from their sides, which enter spaces between blocks L L, which are fixed in ropes suspended from crosses O in the upper part of the chamber; or the trays may be supported in any other suitable or desirable manner, so that each pile can be turned.

The smoke-flues of the stove or heater are carried, preferably, beneath the surface of the ground to a chimney which is situated at the opposite end of the apparatus.

I do not claim, broadly, in this application the means shown for reversing the exhaust-currents of air, as these features form the subject-matter of my application Serial No. 170,914, filed July 7, 1885.

Having thus described my invention, what I claim as new, and desire to secure by Letters Patent, is—

1. In a drying apparatus, a continuous drying-chamber with partly-separating diaphragm or partition, two series of hot-air pipes of different lengths extending along the upper part or ceiling to discharge air at intervals, which passes downward from them, in combination with a series of exhaust pipes or passages extending along the floor or bottom of the chamber, and having openings leading into them, and a suction or draft apparatus, whereby the current is caused to flow downwardly through the chamber, substantially as herein described.

2. In a drying apparatus, a heater having a hot-air chamber connected therewith, hot-air pipes leading along the upper part or ceiling of the drying-chamber, a second series of passages or flues leading along at or beneath the bottom of the chamber, and a fan or suction wheel connected with said passages or flues, whereby currents of air are caused to flow transversely downward through the drying-chamber, substantially as herein described.

3. In a drying apparatus, a chamber or chambers separated by a longitudinal diaphragm, and having heat-supplying pipes extending along the upper part of the chamber and exhaust-flues connected with the lower part and with the suction fan, as shown, in combination with a stove or heater having a hot-air chamber connected therewith and extending across the two ends of the drying-chamber, and a slide whereby the heat passages or pipes communicating with one side of the chamber may be opened, while those communicating with the other side may be closed simultaneously, substantially as herein described.

4. In a drier, the drying chamber or chambers with heat-pipes and discharge-flues extending, respectively, above and below the chambers, and communicating therewith, a heater or stove and desiccating-trays in connection therewith, a separate hot-air chamber, with which the heat-carrying pipes communicate, and a slide by which these pipes may be opened and closed, in combination with a suction fan or wheel rotating within an air-chamber, and passages connecting this chamber with the drying-chamber, said passages having gates so arranged that one may be opened and the other closed, substantially as herein described.

5. In a drying apparatus, and in combination with a drying-chamber and heater, a hot-air chamber or receiver intermediate between the two, into which the air is delivered from the heater, within which it may be impregnated with chemicals, and a double series of pipes, $r$ and $s$, communicating with the receiver, substantially as herein described.

6. In a drying apparatus, and in combination with a drying-chamber or receiver, two series of distributing-pipes of different lengths leading into the drying-chamber, and a slide by which one series of inlet-pipes may be opened and the other closed alternately, substantially as herein described.

7. In a drying apparatus, the turning-crosses suspended from the ceiling, suitable ropes depending therefrom, the blocks secured on the ropes, and the removable trays containing the material to be treated, substantially as herein described.

8. In a drying apparatus, a drying chamber or chambers, a heater from which supply-pipes lead into and alongside the upper part of the chamber, discharge-passages opening into the chambers and along the bottom, and connecting with an exhaust-fan, whereby a downward current is produced from the supply to the discharge passages, in combination with horizontally-rotating turbine wheels, through which the inflowing air passes, and by which it is distributed horizontally over the upper part of the chamber, substantially as herein described.

In witness whereof I have hereunto set my hand.

CHARLES F. BUTTE CASPARI.

Witnesses:
  S. H. NOURSE,
  H. C. LEE.